Patented June 12, 1928.

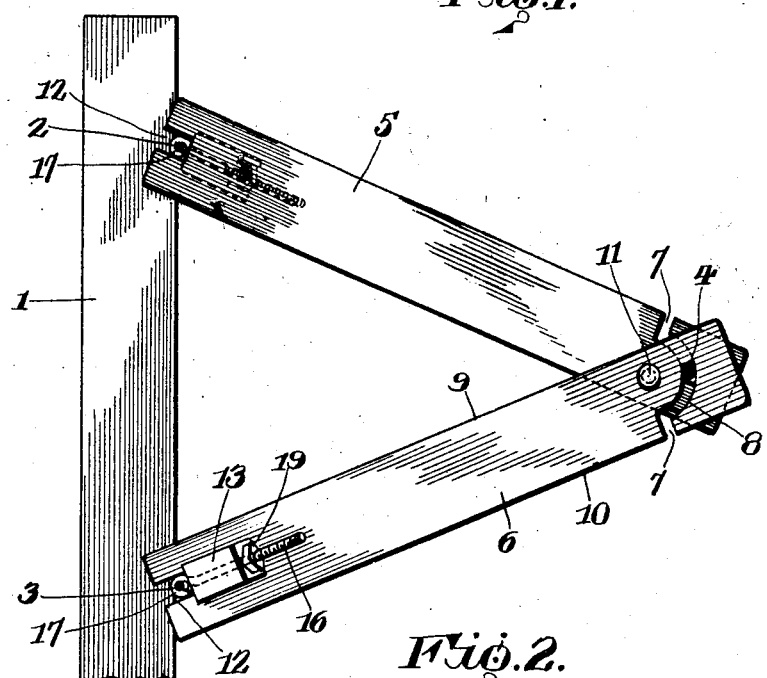

1,673,613

UNITED STATES PATENT OFFICE.

CARL BACH, OF CIRCLEVILLE, OHIO.

REMOVABLE EXTENSION ATTACHMENT FOR WIRE FENCES.

Application filed February 2, 1928. Serial No. 251,394.

This invention relates to a removable extension attachment for wire fences and has for its object to provide, in a manner as hereinafter set forth, means capable of being positioned on either side of a wire fence for the purpose of maintaining a wire in extended position with respect to the fence to prevent live stock and cattle from injuring or breaking the fence down, or in other words acting to protect the fence from live stock and cattle.

Further objects of the invention are to provide, in a manner as hereinafter set forth, a removable extension attachment for wire fences which is simple in its construction and arrangement, strong, durable, compact, expeditiously attached and detached with respect to a wire fence, thoroughly efficient in its use, and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a fragmentary view of a fence post having connected therewith a pair of fence wires, the post being shown in elevation and further illustrating, in side elevation, a removable attachment in accordance with this invention for the purpose of extending a fence wire laterally with respect to the fence.

Figure 2 is a top plan view of a removable extension attachment in accordance with this invention.

Figure 3 is a fragmentary view in longitudinal section of one of the extension bars.

Referring to the drawings in detail 1 indicates a post of a wire fence and to which are secured superposed fence wires 2, 3. The reference character 4 indicates a guard wire which is supported and extended in position with respect to the fence and which acts as a means to protect the fence from live stock and cattle.

The guard wire 4 is supported and maintained in an extended position, relative to the wire fence, by a removable extension attachment in accordance with this invention and which comprises a pair of extension bars 5, 6 of any suitable length, depending upon the distance that the guard wire 4 is to be extended from the wire fence. As each of the extension bars is of the same construction, but one will be described as the description of one will apply to the other.

Each of said bars at its outer end is formed with a slot having a portion 7 which is disposed transversely of the bar and said portion 7 merges into a portion 8 which is of arcuate contour. The inner end of the portion 8 terminates at a point between the longitudinal median and the side edge 9 of the bar and the portion 7 opens at the opposite side edge of the bar indicated at 10. The bars 5 and 6 are pivotally connected in proximity to their outer ends by a pivot means 11 which is positioned between the longitudinal median of the bars and one side edge thereof. When the bars 5 and 6 are pivotally connected together, they are oppositely disposed with respect to each other whereby the portion 7 of the slot formed in the bar 5 will open at the top edge of the latter and the portion 7 of the slot formed in the bar 6 will open at the bottom edge of the latter. When the bars are connected together the pivot means 11 will be disposed between the longitudinal median of the bar 5 and its bottom edge and between the longitudinal median of the bar 6 and its top edge. The inner ends of the slots formed in the bars 5, 6, coact to clamp the guard wire 4 between the outer end of said extension bars and further these latter support the guard wire 4.

The inner end of each bar 5, 6 is bifurcated as at 12 and the outer face of each extension bar is provided with a lug 13 formed with an inclined opening 14, the inclination of the opening 14 being downwardly from the inner end to the outer end of the lug 13. The opening 14 in each lug 13 opens at the base of the bifurcated inner end of a bar.

Slidably mounted in each opening 14 is a clamping hook 15 having the upper portion of its shank peripherally threaded as at 16. The bill of the hook 15 is indicated at 17 and is arranged at the lower end of the opening 14. The wall at the lower end of the opening 14 is flared as at 18 to provide a clearance for the bill 17 when the hook 15 is shifted to clamping position with respect to the fence wire. Mounted on the threaded portion 16 of the shank of the hook 15 is an adjusting nut 18 which coacts with the upper end of the lug 13 and coacts with the bill 17 for clamping the fence wire in the bifurcated end of an extension bar. Each lug 13 is downwardly inclined and its inner or upper end is disposed at an inclination as indicated at 20.

When the extension bars 5, 6 are in extension position with respect to the guard wire 4 the bar 5 at its inner end overlaps the fence wire 2 and the bar 6 at its inner end overlaps the fence wire 3. The number of pairs of extension bars depends upon the length of the guard wire 5. The extension bars 5, 6 can be formed of any suitable material, preferably metal. When the hook 15 is shifted to non-clamping position, the attachment can be readily removed from the fence wires 2, 3. The attachment can be arranged to extend from either side of the fence. When the extension bars are arranged in operative position the slots at the outer ends thereof are oppositely disposed and the clamping hooks are arranged on the outer sides of the bars.

It is thought the many advantages of a removable extension attachment, in accordance with this invention, for protecting wire fences can be readily understood, and although the preferred embodiment of the invention is as illustrated and described, yet it is to be understood that changes in the details of construction can be had which will fall within the scope of the invention as claimed.

What I claim is:

1. A removable extension attachment for the purpose set forth comprising a pair of extension bars pivotally connected together in proximity to the outer ends thereof, said bars being provided outwardly with respect to the pivot connection therebetween with oppositely disposed slots opening at their outer ends and closed at their inner ends for connecting thereto and supporting a guard wire in extended position with respect to a fence, said bars having their inner ends bifurcated for straddling fence wires, and adjustable means carried by the inner ends of said bars for clamping the fence wires thereto whereby the guard wire is maintained in extended position with respect to the fence wires.

2. A removable extension attachment for the purpose set forth comprising a pair of extension bars pivotally connected together in proximity to their outer ends, said bars being provided outwardly with respect to the pivot connection therebetween with oppositely disposed slots opening at their outer ends and closed at their inner ends for connecting thereto and supporting a guard wire in extended position with respect to a fence, said bars having bifurcated inner ends for straddling a pair of superposed fence wires, and an adjustable hook element carried by the inner ends of said bars for clamping the fence wires thereto whereby the guard wire will be maintained in extended position with respect to the fence wires.

3. A removable extension attachment for the purpose set forth comprising a pair of extension bars pivotally connected together and having means for connecting thereto and supporting a guard wire, said bars having their inner ends bifurcated for straddling a pair of superposed fence wires, and adjustable means slidably carried by the inner ends of said bars and coacting with the furcations at said ends for clamping the fence wires thereto whereby the guard wire will be maintained in extended position with respect to the fence wires.

In testimony whereof, I affix my signature hereto.

CARL BACH.